United States Patent [19]

Hickman et al.

[11] Patent Number: 5,759,496

[45] Date of Patent: Jun. 2, 1998

[54] APPARATUS FOR REMOVING VOC'S FROM AN EXHAUST GAS STREAM

[75] Inventors: David L. Hickman, Big Flats; Timothy V. Johnson; David S. Weiss, both of Corning, all of N.Y.

[73] Assignee: Corning Incorporated, Corning, N.Y.

[21] Appl. No.: 576,824

[22] Filed: Dec. 21, 1995

[51] Int. Cl.$^6$ ............................................. F01N 3/10
[52] U.S. Cl. ........................... 422/171; 422/174; 422/177
[58] Field of Search .................................. 422/171, 177, 422/174

[56] References Cited

U.S. PATENT DOCUMENTS

| | | |
|---|---|---|
| 4,402,717 | 9/1983 | Izumo et al. . |
| 4,758,272 | 7/1988 | Pierotti et al. . |
| 4,985,210 | 1/1991 | Minami . |
| 5,057,128 | 10/1991 | Panzica et al. . |
| 5,169,414 | 12/1992 | Panzica et al. . |
| 5,194,719 | 3/1993 | Merkel et al. . |
| 5,254,840 | 10/1993 | Thompson . |
| 5,259,190 | 11/1993 | Bagley et al. . |
| 5,306,675 | 4/1994 | Wu et al. . |
| 5,338,540 | 8/1994 | Maurer . |
| 5,356,852 | 10/1994 | DeLiso et al. . |
| 5,393,499 | 2/1995 | Bagley et al. . |
| 5,427,601 | 6/1995 | Harada et al. . |
| 5,451,444 | 9/1995 | DeLiso et al. . |

FOREIGN PATENT DOCUMENTS

| | | |
|---|---|---|
| 0 294 106 B1 | 9/1987 | European Pat. Off. . |
| 4104513 A1 | 8/1991 | Germany . |

*Primary Examiner*—Timothy McMahon
*Attorney, Agent, or Firm*—Timothy M. Schaeberle

[57] ABSTRACT

The instant invention is directed at an apparatus for removing VOC's from an exhaust gas stream comprised of the following: a heatable adsorber located in the exhaust stream capable of desorption; and, an oxidizer structure having a lightoff temperature and located in the exhaust stream downstream from the adsorber structure. One particular embodiment of the apparatus comprises the following two elements: (1) a resistively heatable adsorber possessing an activated carbon phase located in the exhaust stream and having a desorption temperature; and, (2) an electrically heatable catalyst structure having a lightoff temperature and located in the exhaust stream downstream from the adsorber structure.

The method enabled as a result of the development of the aforementioned apparatus, i.e., a method for removing VOC's from an exhaust stream, involves two essential steps: (1) causing exhaust gases from an exhaust gas stream to flow through an adsorber structure and an oxidizer while adsorbing an amount of VOC's; and, (2) heating the oxidizer to its lightoff temperature and desorbing the adsorbed VOC's and thereafter flowing the desorbed compounds through the oxidizer whereupon they are oxidized. One particular embodiment involves two essential steps: (1) flowing VOC-containing exhaust gases through an adsorber structure having an activated carbon phase and an electrically heatable catalyzed structure while adsorbing an amount of VOC's; and, (2) heating the catalyzed structure to its lightoff temperature, desorbing the adsorbed VOC's and thereafter flowing the desorbed compounds through the catalyzed structure whereupon the desorbed VOC's are oxidized.

10 Claims, 1 Drawing Sheet

APPARATUS FOR REMOVING VOC'S FROM AN EXHAUST GAS STREAM

FIELD OF THE INVENTION

This invention relates to an in-line apparatus, and method, for removing volatile organic compounds from a fluid stream comprising an adsorber and downstream oxidizer for oxidizing the volatile organic compounds. More particularly, this invention relates to the use of an activated carbon phase-containing adsorber and an electrically heatable catalyst structure to remove volatile organic compounds from a fluid stream.

BACKGROUND OF THE INVENTION

The removal of sorbable components from a gas or vapor stream by flowing such stream through a body of adsorbent material is a fundamental engineering practice; one type of sorbable component being volatile organic compounds (hereinafter referred to as VOC's).

VOC's are formed in large quantities but at relatively low concentrations from gas turbines, cogeneration plants, petrochemical plants, and in many industrial processes where waste gases contain such materials as vapors of various solvents, inks, paints and so forth. Smaller operations such as bakeries, dry cleaners, industrial cleaning modules and small paint shops also produce VOC's, though in smaller quantities. VOC's contain a variety of hydrocarbons—saturated, unsaturated, and aromatic—but also contain oxygenated derivatives such as alcohols, esters, ethers, acids, nitrogen-containing compounds (mercaptans and thioethers), sulfur-containing compounds and halogen-containing materials, especially chlorine-substituted hydrocarbons but also organic fluorides and bromides. The presence of these VOC's in the gas stream can present a health risk, an environmental risk or cause the gas stream to have an unpleasant odor.

The widespread use of solvents in industrial applications has resulted in increased emissions of VOC's into the atmosphere, giving rise to environmental concerns and prompting stricter legislative controls on such emissions. As a consequence, the aforementioned operations face a dilemma in removing VOC's from their process gas streams—recovery costs are very often higher than the value of the VOC's recovered and equipment that destroys the solvents in the exhaust streams is expensive. This dilemma has led to inquires into lower cost methods of removing organic vapors from the process gas streams, especially for the smaller operations.

Conventional adsorption systems for solvent recovery and/or solvent destruction from humid air typically are operated until the solvent concentration in the outlet gas stream reaches a detectable preset breakthrough level whereupon the gas flow to the adsorber is stopped. The adsorbent bed then contains solvent, other condensable organic contaminants, and some amount of water which depends on the inlet relative humidity of the solvent laden gas stream and the affinity of the adsorber for water. At this point, present-day techniques involve the introduction of steam, either saturated or superheated, or hot gas which displaces the solvent from the adsorbent to produce a solvent/water mixture upon condensation. Typically two or more adsorber beds are used, where some are adsorbing while others undergo regeneration. More recent technology for regenerating and recovering solvent from adsorbent beds involves the use of inert gases (though for some solvents, air also can be used) and low temperature condensation of the solvent from the regenerating gas. Alternatively, the concentrated solvents can be burned instead of condensed.

Of those techniques for removing VOC's from a gas stream by adsorption, a common method is exemplified in U.S. Pat. No. 4,402,717 to Izumo et al. In Izumo et al., an apparatus for removing moisture and odors from a gas stream comprises a cylindrical honeycomb structure made from corrugated paper, uniformly coated with an adsorbent and formed in the shape of a disk or wheel. The multiplicity of adsorbent-coated parallel flow passages formed by the corrugations in the paper serve as gas passage ways which are separated as a zone for the removal of water and odor causing components in the gas, and as a zone for the regeneration of the adsorbent. The zones for removal and regeneration are continuously shiftable as the wheel is rotated circumferentially about its centerline.

Although the prior art methods and apparatus used for VOC removal provided satisfactory removal rates, they required the use of large stationary systems utilizing regenerative/desorption gases, the use of external combustion gases to heat the gases and large processing equipment to handle the flow of gases. All of these factors resulted in the systems being too large and expensive for use in smaller operations. Accordingly, the present invention is directed at a novel VOC removal apparatus which is economically feasible for use, especially by those aforementioned smaller-type operations.

SUMMARY OF THE INVENTION

Accordingly, it is an objective of this invention to provide an apparatus which is capable of continuous adsorption and removal of VOC's with simultaneous regeneration. Generally, the apparatus for removing VOC's from an exhaust gas stream comprises two elements: an adsorber located in the exhaust stream and having a desorption temperature and an oxidizer capable of oxidizing the VOC's having a lightoff temperature and located in the exhaust stream downstream from the adsorber structure. One particular embodiment comprises the following two elements: (1) a resistively heatable adsorber possessing an activated carbon phase located in the exhaust stream and having a desorption temperature, and, (2) an electrically heatable catalyst structure having a lightoff temperature and located in the exhaust stream downstream from the adsorber structure.

Simply stated, the method enabled as a result of the development of the aforementioned apparatus, i.e., a method for removing VOC's from an exhaust stream, involves flowing VOC-containing exhaust gases through an adsorber structure and an oxidizer while adsorbing an amount of VOC's, heating the oxidizer to its lightoff temperature and desorbing the adsorbed VOC's and thereafter flowing the desorbed compounds through the oxidizer whereupon the desorbed VOC's are oxidized. One particular embodiment involves two essential steps: (1) flowing VOC-containing exhaust gases through an adsorber structure having an activated carbon phase and an electrically heatable catalyzed structure while adsorbing an amount of VOC's; and, (2) electrically heating the catalyzed structure to its lightoff temperature, desorbing the adsorbed VOC's and thereafter flowing the desorbed compounds through the catalyzed structure whereupon the desorbed VOC's are oxidized.

An advantage of this invention is that in one embodiment the method can be practiced whereby the VOC-containing exhaust gas flows continuously through the system during the entire process.

DETAILED DESCRIPTION OF THE INVENTION

Figure 1:
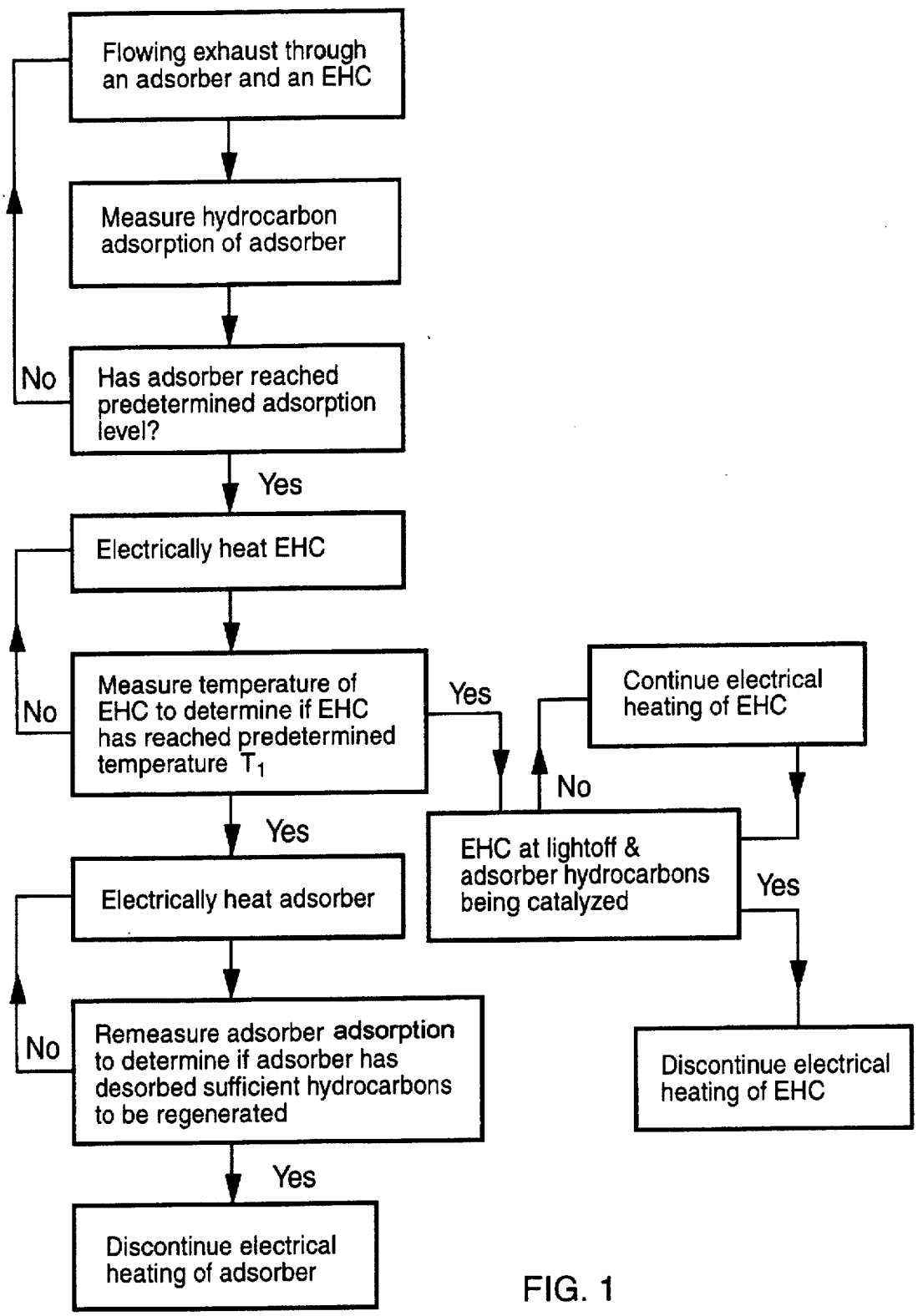
FIG. 1 is a flow chart illustrating one embodiment of the exhaust gas VOC removal process performed by the inventive exhaust apparatus disclosed herein.

The object of the invention, to provide a method and an apparatus for the continuous and efficient removal of VOC's in a package that is compact and cost effective, is accomplished by the apparatus described herein. Generally, the apparatus comprises an adsorber located in the exhaust stream and having a desorption temperature and, an oxidizer capable of oxidizing the VOC's located downstream from the adsorber structure. The adsorber preferably selected from the group consisting of electrically conductive structure possessing an activated carbon phase, zeolites supported on an inorganic substrate, and a granular activated carbon bed, as well as other adsorbers which function to adsorb VOC's. On the other hand, the oxidizer is selected from the group consisting of an electrically heatable catalyst structure, an ignitable thermal oxidizer and an ignitable or heatable catalyst bed.

It is contemplated that a heat exchanger may be incorporated in to the apparatus and positioned downstream of the oxidizer; the function of the heat exchanger would be to recycle the heat generated by the oxidation reaction of the oxidizer for use to heat the adsorber.

One particular embodiment of the inventive apparatus comprises two main elements; a resistively heatable adsorber and an electrically heatable catalyst structure or an"EHC" structure. The adsorber itself exhibits the following characteristics; it is comprised of a structure possessing an activated carbon phase, it is located in the exhaust stream and it exhibits a desorption temperature. The EHC, on the other hand, has a lightoff temperature and is located in the exhaust stream downstream from the adsorber structure. The lightoff temperature of the EHC is that temperature at which greater than 50% of the reactive species in the gas stream are being catalyzed by the EHC The lightoff temperature is signaled when the EHC structure's rate of temperature rise due to resistive heating increases suddenly due to heat generated by the exothermic catalysis reactions.

Generally speaking, the method for removing VOC's from an exhaust stream performed by the apparatus of the present invention, involves the basic steps as follows: (1) flowing VOC-containing gases from an exhaust gas stream through an adsorber and an oxidizer while adsorbing an amount of VOC's; (2) heating the oxidizer to its lightoff temperature and desorbing the adsorbed VOC's by heating the adsorber structure to a temperature above which VOC's are desorbed; and, thereafter, (3) flowing the desorbed VOC's through the oxidizer whereupon the desorbed VOC's are oxidized. Furthermore, the VOC-containing gas flows continuously through the system during the entire process; i.e., it is the gas which carries the desorbed VOC's to the oxidizer.

One particular embodiment of the invention comprises: (1) flowing VOC-containing exhaust gases through an adsorber structure having an activated carbon phase and an electrically heatable catalyst structure while adsorbing an amount of VOC's; (2) electrically heating the catalyst structure to its lightoff temperature and desorbing the adsorbed VOC's; and, (3) flowing the desorbed VOC's through the catalyst structure whereupon the desorbed VOC's are oxidized. Electrically heating both the catalyst structure and the conductive adsorber structure is accomplished by directing an electrical current to the catalytic and adsorber structure, respectively. It will be appreciated that desorption of the VOC's should be maintained at a rate whereby the concentration is combustible but not explosive.

It is contemplated that this method can be practiced whereby the catalyst structure itself generates a sufficient amount of downstream heat in reaching its lightoff temperature to cause the adsorber to reach a temperature sufficient to result in desorption. In other words, this downstream heat could be recycled by a heat exchanger apparatus and supplied back to the adsorber for heating the adsorber to thereby desorb the VOC's.

In its simplest form, the method contemplates causing the VOC-containing exhaust gas to flow through the adsorber and the oxidizer during the operating hours, i.e., during the time when the VOC-containing exhaust gas is being generated. The regeneration of the adsorber, as described above, occurs during shutdown or times during which no VOC-containing exhaust is being produced.

However, it should be noted that one advantage of this system is that the system can be run whereby the VOC-containing gas flows continuously through the system during the entire, adsorption and desorption, process. In other words, one embodiment of the inventive method is directed at a continuous method for removing VOC's from an exhaust stream—a continuous process for adsorption and regeneration. Generally, this continuous method involves the following steps: (1) flowing VOC-containing exhaust gas through an adsorber and an oxidizer while adsorbing the VOC's in the exhaust gas; (2) monitoring the adsorption level of the adsorber to determine when the adsorber has reached a predetermined adsorption level sufficient to require regeneration of the adsorber; and thereafter, (3) heating the oxidizer to a temperature a temperature, $T_1$, sufficient to permit the oxidizer to reach its lightoff temperature prior to the complete desorption of the VOC's, and thereafter, (4) heating the adsorber to a temperature sufficient to initiate and maintain desorption of the adsorbed compounds and flowing the desorbed compounds through the oxidizer whereupon they are oxidized; and, (5) continuing to heat the adsorber for a time sufficient to at least desorb the VOC's.

It should be appreciated that in both the simple method and the more detailed continuous process the adsorber may be comprised of a granular activated carbon bed, zeolites supported on an inorganic structure, as well as other adsorbers capable of adsorbing VOC's, while the oxidizer could be an ignitable or heatable catalyst bed or an ignitable thermal oxidizer.

In another embodiment of the continuous process it is contemplated that the adsorber is electrically conductive and possesses an activated carbon phase-containing and the oxidizer is an electrically heatable catalyst structure. Directing an electrical current, to the catalyst structure and the adsorber structure, i.e. electrical heating, accomplishes both the heating and the desorbing.

Referring now to FIG. 1, illustrated therein is a flow diagram depicting in greater detail the particular "electrical heating" embodiment of the of the continuous method. Initially, the method involves flowing VOC-containing exhaust gas through the aforementioned resistively heatable adsorber and the electrically heatable catalyst (EHC) structure while adsorbing the VOC's in the exhaust stream. The adsorber is monitored to determine when the adsorber requires regeneration; specifically, it should be monitored to measure whether the adsorber has reached an adsorption level sufficient to require regeneration of the adsorber. This regeneration level can be any predetermined level, e.g., a level at which the adsorber has reached its full adsorptive capacity.

Once the adsorber has reached the regeneration level, electrical heating of the EHC occurs; preferably, electrically heating is accomplished by directing electrical current to the EHC structure. Once the EHC begins its temperature increase, the EHC is monitored to determine when the EHC has reached a predetermined temperature $T_1$; any temperature up to, and equal to, the EHC's actual lightoff temperature. At a minimum, $T_1$ must be a temperature at which current can be sufficiently directed to the EHC whereby the EHC will be able to reach its lightoff temperature prior to the adsorber desorbing a significant amount of VOC's; significant amount, preferably defined as 10% or greater of the total VOC's adsorbed. This assumes that current is directed to the adsorber beginning at the time that the EHC reaches $T_1$ and continues until the adsorber has desorbed a significant amount VOC's. However, it should be noted that in order to ensure that no VOC's will be released to the atmosphere unoxidized, $T_1$ should preferably be approximately equal to the EHC's lightoff temperature.

Once the EHC has reached its predetermined temperature $T_1$ electrical heating of the adsorber occurs and continues until sufficient desorption is accomplished. Preferably, electrical heating is done by directing current or electrical energy to the adsorber. In other words, by impressing a current through the electrically resistant adsorber, the adsorber is heated to a temperature sufficient to facilitate desorption of the adsorbed VOC's. Preferably, the temperature of the adsorbent should be raised to, and maintained within, the temperature range of between about 100° C. and 300° C.; this temperature being dependent upon the boiling point of the VOC's and the adsorption energy.

As the adsorber desorbs VOC's, they thereafter are carried by the process exhaust gas through the EHC whereupon they are oxidized. Oxidation is an exothermic reaction thus allowing the current being directed to the EHC to be discontinued; the reaction itself is sufficient to maintain the EHC at a temperature above its lightoff. Once desorption begins, it continues to be necessary to monitor the adsorption level of the adsorber to determine when the adsorber has been sufficiently regenerated. Specifically, it should be monitored so that it can be determined when the adsorber has reached an adsorption level sufficient to justify discontinuance of the regeneration process. It should be noted that the current supply to the adsorber should be maintained throughout the desorption process; the desorption reaction is not exothermic, but endothermic, and therefore will not sustain the adsorber at a temperature above which desorption occurs. The level at which regeneration can be discontinued can be any predetermined level, e.g., a level at which the adsorber has nearly desorbed all the previously adsorbed VOC's. When the adsorber has reached this predetermined level, the current being directed to the adsorber should be terminated.

It will be appreciated that in any of the above embodiments if the size of the adsorber makes it either impractical or inefficient to heat and desorb the entire adsorber structure at once it is possible that portions of adsorber may be selectively desorbed. For example, VOC-containing exhaust gas or portions thereof can be selectively directed, by means of a diverter apparatus, to specific portions of the adsorber which are less than the entire adsorber but which can be sufficiently and practically heated to desorb the VOC's.

Once each portion of the adsorber is desorbed the exhaust gas can be redirected to another portion for desorption with the process continuing until the entire adsorber has been desorbed.

For purposes of the present invention, it is preferred that the resistively heatable adsorber be substantially similar to that is disclosed in U.S. patent application Ser. No. 08/249, 897 (Gadkaree et al.) hereinafter incorporated by reference. Specifically, it discloses an electrically heatable activated carbon body made of a non-metallic monolithic structure which may be in the form of an activated carbon coated nonconductive inorganic unitary substrate or a unitary structure shaped entirely of activated carbon. Furthermore, the body has a means in contact with the structure for conducting an electric current therethrough. With the passage of an electric current through the carbon, the carbon heats up to a predetermined temperature depending on the electrical resistance of the body and the voltage applied. The body can be designed with resistance and voltage suitable for raising the temperature of the structure significantly above the desorption temperature of the adsorbed species. Therefore, depending on the species adsorbed, the temperature can be controlled in such a way as to cause desorption of the adsorbed species. Preferably, the body is disclosed as being an activated carbon coated honeycomb which is fitted, on two opposing sides, with a conducting metal.

The substrate utilized for the adsorber can be made from any known nonelectrically conducting inorganic material, and made by any known process. However, it is essential that the substrate have the following characteristics; pores extending from its outer surface and ability to withstand the heat-treatment seen in the forming of the activated carbon coating.

Porous substrate materials suitable for use include ceramic, glass, and physical or chemical combinations thereof, e.g., mixtures, compounds, or composites. Materials that are especially suitable include those made of cordierite, mullite, clay, talc, zircon, zirconia, zirconates, zirconia-spinel, magnesium alumino-silicates, spinel, alumina, silica, silicates, borides, alumino-silicates, such as, porcelains, lithium alumino-silicates, alumina silica, feldspar, titania, fused silica, nitrides, borides, carbides, such as, silicon nitride, or mixtures thereof. Cordierite is preferred because its coefficient of thermal expansion is comparable to that of carbon, thereby increasing the stability of the activated carbon body. Some typical ceramic substrates are disclosed in U.S. Pat. Nos. 4,127,691 (Frost) and 3,885,977 (Lachman et al.); both of which patents are herein incorporated by reference.

The substrate utilized may be so in a variety of forms, including honeycombs, tubes, foams or multicellular bodies. Furthermore, it is desirable that the substrate have open-ended channels for passage of a gas stream in and out of the body. In the preferred form, the substrate comprises a honeycomb shape having a matrix of thin walls which form a multiplicity of open-ended cells extending between the honeycomb ends. Preferably, the honeycomb structure is one which possesses between about 200–400 cells/inch with a wall thickness ranging from 6–12 mils.

Preferably, a carbon coating is applied by contacting the substrate with a liquid carbon precursor which is cured and carbonized, and thereafter activated i.e. a carboncontaining material which converts to a continuous carbon upon heating. The carbon precursor is preferably liquified to penetrate into the interconnecting pores of the substrate so that upon curing and carbonizing, a coating is produced that is physically interlocked within the interconnecting pores of the substrates. One preferred body of this type is described in U.S. Pat. No. 5,451,444 (DeLiso et al.); this application is incorporated by reference.

Carbon precursors useful in the present invention include any liquid or liquefiable carbonaceous substance including thermoplastic resins (e.g., polyvinylidene chloride, polyvinyl chloride, polyvinyl alcohol, and the like), sugar solutions, furfuryl alcohol, and coal tar pitch. Low viscosity carbon precursors (e.g., thermoset resins) are preferred because their lower viscosity allows greater penetration of the carbon precursor into porous inorganic substrates. Phenolic resins are most desirable because of their low viscosity, high carbon yield, high degree of cross-linking upon curing relative to other precursors, and low cost. The carbon precursor liquid used in the present method can include a single precursor material or a mixture of two or more precursor materials. Optionally, activated carbon can be added to the carbon precursor liquid to increase the adsorptive capability of the activated carbon structure. The amount of carbon precursor retained by the substrate can be increased, e.g., by contacting the substrate with the precursor more than once, by varying the viscosity of the precursor and by allowing the substrate to dry between contacting steps. In addition, the amount of precursor retained by the substrate can be controlled in porous substrates by simply modifying the overall porosity of the substrate (e.g., increasing porosity will increase the amount of precursor retained by the substrate and in turn the amount of carbon formed thereon).

The substrate and carbon precursor are then subjected to heat-treatments to cure the precursor and thereafter convert the precursor to continuous carbon (carbonize). The resulting carbon-coated substrate is then heat-treated to activate the carbon and produce an activated carbon structure.

Curing is accomplished typically by heating the coated substrate to temperatures of about 100° C. to about 200° C. for about 0.5 to about 5.0 hours. Curing is generally performed in air at atmospheric pressures. When using certain precursors (e.g., furfuryl alcohol), curing can be accomplished by adding an acid catalyst at room temperature.

Carbonization is the thermal decomposition of the carbonaceous material, thereby eliminating low molecular weight species (e.g., carbon dioxide, water, etc.) and producing a fixed carbon mass and a rudimentary pore structure in the carbon. Such conversion or carbonization of the cured carbon precursor is accomplished typically by heating the substrate to a temperature in the range of about 600° C. to about 1000° C. for about 1 to 10 hours in a reducing or inert atmosphere (e.g., nitrogen, argon, etc.).

Curing and carbonizing the carbon precursor on the substrate results in a structure having a coating extending over the entire surface of the substrate in the form of a substantially uninterrupted layer of carbon. This carbon coating is anchored into the porosity of the substrate and as a result is highly adherent. The top surface of the carbon coating is an uninterrupted layer of carbon to carbon bonds.

The conducting means is typically either in the form of a strip of conducting material, electrode or a coating of conductive material on the monolith structure. As used herein, the term "conductive coating" refers to the coating which is applied to the activated carbon structure and is thereby differentiated from the carbon coating in carbon coated structures. Some especially preferred conducting materials are metals such as copper, silver, aluminum, zinc, nickel, lead, tin and their alloys, with the preferred being copper because of its high conductivity which minimizes resistance and is inexpensive.

If an electrode is used, it can be applied by pressure contact, e.g., a spring. A strip of conducting metal 18 or 19 can also be used and can be attached to the structure by an electrically conducting adhesive, e.g., #3021 from Acme Chemicals & Insulation Co.

One especially suitable geometry is having the conducting metal applied to opposing surfaces of the body. By opposing surfaces is meant surfaces that are so spaced according to the geometry of the body that passage of a current between the conductive surfaces produces a current that heats the carbon uniformly.

The conductive coating can be applied by any known suitable technique such as frit bonding, arc spraying, flame spraying, plasma spraying, ultrasonic soldering, painting, etc.

The invention is not limited to any specific thickness of the coating. Thickness depends on the nature of the coated surface and the coated metal. The coating must be thick enough to provide a good low resistance current path, and to last, that is be resistant to oxidation and corrosion and to have good mechanical stability. However the coating should not be so thick as to chip or flake off or be prohibitively expensive.

One especially suitable conductive coating technique involves first ensuring that the activated carbon coated surface is smooth. This is usually done by grinding the activated carbon coated surface until flat and smooth. If the surface is rough it is ground on a 600 grit abrasive paper. The conductive coating is then applied over the smooth activated carbon coating. Some useful techniques for applying the conductive coating are described below.

As disclosed in Gadkaree, alternatively, the carbon structure can be made totally of activated carbon having porosity for passage of a workstream through, with the preferred shape being previously described honeycomb. Such structures can be made by conventional forming techniques as molding, or shaping a plasticized mixture of activated carbon particles and binders, e.g. soluble organic binders and/or resins, etc. e.g. by extrusion, and heat-treating. Some shaped activated carbon structures which are suitable are described in U.S. Pat. Nos. 4,399,052 (Sugino), 4,518,704 (Okabayashi et al.), 4,999,330 (Bose et al), and 5,043,310 (Takeuchi et al.), among others, and in U.S. patent application Ser. Nos. 08/228,198 (Gadkaree et al.) 08/434,221 (Gadkaree et al.). The conducting means on these structures could be the same as that previously described for the activated carbon coated structures.

The electrically heatable or "EHC" structure which is best suited for use in this is any electrically conductive cellular or honeycomb structure which can be electrically heated to above its lightoff temperature to thereafter lightoff exhaust gases and/or burn off/oxidize the desorbed VOC's which pass through the structure. The cellular or honeycomb structure may be either metal or ceramic. Specific examples of metal EHC structures which could be utilized in the instant invention are disclosed in the following U.S. Pat. Nos. 4,758,272 (Pierotti et al.), 5,194,719 (Merkel et al.), 5,254,840 (Thompson et al.) and 5,427,601 (Harada et al.), all of which are assigned to the instant assignee and incorporated herein by reference. Possible ceramic EHC structures which can be utilized are disclosed in U.S. Pat. Nos. 5,259,190 (Bagley et al.) and 5,393,499 (Bagley et al.) both assigned to the assignee of the instant invention and incorporated herein by reference.

For purposes of the present invention, it is preferred that the electrically heatable catalyst structure be substantially similar to that disclosed in the aforementioned Harada patent, wherein it discloses sintered metal bodies of comprised of Fe-Cr-Al. Specifically, the metal disclosed therein has a composition consisting essentially, in percent by weight, of about 5 to about 40 chromium, about 2 to about 30 aluminum, 0 to about 5 of special metal, 0 to about 4 of rare earth oxide additive, with the balance being iron group metal and unavoidable impurities. Furthermore, the composition includes at least one component selected from component A and component B, with component A being the special metal, and component B being at least an effective amount of the rare earth oxide additive to enhance the life of the body. The special metal being a first special metal component, consisting of at least one of: Y, lanthanides, Zr, Hf, Ti, Si, and B, and optionally, a second special metal component when the amount of the rare earth oxide additive is 0, consisting of at least one of: alkaline earth metal, Cu, and Sn. The special metal being a third special metal component when the amount of rare earth oxide additive is >0; consisting of at least one of: Y, lanthanides, Zr, Hf, Ti, Si, alkaline earth metal, B, Cu, and Sn.

The method for preparation of the body of the metal body generally involves the following, with the specific details more fully described in Harada:

Metal and/or metal alloy powders and optionally, rare earth oxide powders, are mixed in amounts necessary to result in the body having the desired composition; a relatively uniform admixture is obtained, typically by dry blending to form a homogeneous blend. The admixture is formed into a green body, preferably a honeycomb shaped body formed preferably by extrusion.

Preferably, the admixture is combined with an organic binder, e.g. methyl cellulose, polyvinyl alcohol, etc.) and vehicle, and optionally other aids, e.g. aids to prevent oxidation to form a relatively homogeneous wet mixture. One example of a binder/vehicle combination is methyl cellulose/water respectively. With this combination, it is preferred to add an organic acid such as oleic acid as an aid to prevent oxidation of the metal powders. One example of a binder/aid/vehicle combination is about 4 g methyl cellulose, about 1 g oleic acid, and about 11 g to about 12 g water per about 100 g of the admixture composition.. This mixture is formed into a green body by extruding. By a green body is meant the body as formed, and unsintered. The formed body is dried, typically by air drying.

The green body is then sintered in a non-oxidizing atmosphere, preferably an atmosphere containing hydrogen, at a sufficient temperature for a sufficient time to form a densified body therefrom having an open porosity of about 0% to about 50%, and preferably from about 0% to about 30%; the preferred sintering atmosphere is hydrogen with the preferred sintering technique being to surround the body to be sintered with a sintering jig in the vicinity of or in contact with the material. The preferred sintering temperatures range from about 1000° C. to about 1400° C.

Preferably, the resulting sintered body is then heat-treated in an oxidizing atmosphere at a sufficient temperature, at any desired rate, for a sufficient time to form an oxide coating on the surfaces of the body. The coating is typically aluminum oxide. The oxide coating is present on all external surfaces including the open pore surfaces and on the configural surfaces of the body. The heat-treating temperature and time are sufficient to result in a relatively uniform and complete coating of oxide. The preferred heat-treating temperatures are about 700° C. to about 1200° C., and preferably about 1000° C. to about 1200° C.

Harada discloses that the body can be suitably used in applications in which they are exposed to oxidizing atmospheres at high temperatures, such as for example, in carriers for catalysts for exhaust gas purification, etc., heaters, eg. catalyzed heaters.

Harada discloses a desirable body composition for these applications, in weight percent, of (1) about 5 to about 40 chromium; (2) about 2 to about 30 aluminum;

(3) at least one component selected from:
   about 0.01 to about 5 of at least one element selected from the following
   group (a) elements and/or the following group (b) elements;
   group (a) elements: Y, lanthanides, Zr, Hf, Ti, Si, and alkaline earth
   metal, group (b) elements: B, Si, La, Ce, Cu, and Sn; and, (4) up to about 4 of rare earth oxide additive, and the remainder being iron group metal and unavoidable impurities.

Some degree of open porosity, which affords high surface area for contact with the catalyst or catalyst system as well as better washcoat adherence, is preferred. A honeycomb structure is preferred because of the high geometric surface area. In this type of application, it is desirable that the cell density be about 0.9 to about 341 cells/cm$^2$ (about 6 to about 2200 cells/in$^2$). In these applications, the preferred cell wall thickness is about 50 to about 2000 micrometers. The body of the present invention is resistant to oxidation and corrosion that can occur when the body is being catalyzed., for example, in the application when it is exposed to temperature fluctuations and contact with auto exhaust.

The body of the present invention can be used as a heater wherein it has heating means to heat it to a desired operating temperature. Honeycombs are especially desirable as heaters, especially those as described above. The term "honeycomb structure" as used in the Harada reference refers to an integral body having a number of passages or cells partitioned by walls. The passages can have any cross-sectional shape, e.g. circular, polygonal, or corrugated shape. There is no limitation on dimensions, e.g.. diameter, length, number of cells or thickness of cell walls in the honeycomb as these can vary according to the application. Especially preferred are extruded honeycombs.

In applications such as this, the body can be equipped with heating means, such as electrodes, for rapid heat-up. Additionally, a resistance adjusting mechanism can be provided between the electrodes to control the heat generation and local or systemic heating as required depending on the application.

In accordance with a preferred embodiment, a heat-resistant sintered metal body of the present invention having a honeycomb structure is provided with electrodes. Between the electrodes is provided a resistance adjusting mechanism in various forms whereby a resistance adjusting type of honeycomb heater is produced.

Some examples of typical resistance adjusting mechanisms which can be provided on the honeycomb heater, although the invention is not limited to these, are:

(1) a slit or slits of any length, formed in any direction at any portion of the body, (2) variations in the length of cell walls of the honeycomb in the axial direction of the passages, (3) variations in the thickness (wall thickness) of the cell walls of the honeycomb structure, or variations in the cell density of the honeycomb structure, (4) a slit or slits formed in the rib of the honeycomb structure.

The honeycomb body is provided with electrodes usually on the outer periphery (wall cells) of the structure or inside the structure by means of brazing, welding, or the like, whereby a resistance adjusting type of honeycomb is produced.

Preferably, this resistance adjusting type honeycomb heater is formed so as to have a total resistance ranging between about 0.001 ohm and about 0.5 ohm.

In one embodiment a catalyst may be placed on the surface of the thus-obtained resistance type honeycomb heater with suitable catalysts being any of those catalysts which are capable of oxidizing the VOC's to form water and carbon dioxide. Such catalysts, well known in the art, which can be used in the catalyst structure of the instant invention, include catalysts such as platinum, rhodium, palladium, vanadium and mixtures of these. Preferably, the catalyst is comprised of vanadium and/or its oxides.

It is contemplated that these catalysts may be incorporated into the honeycomb structure by known methods.

It is contemplated that the actual EHC structure could include the resistance type honeycomb heater disclosed, which would simply function as a heater, located upstream from a catalyst bed which would oxidize the VOC's flowing through it.

In addition to the embodiments discussed above, it will be clear to persons skilled in the art that numerous modifications and changes can be made to the above invention without departing from its intended spirit and scope.

We claim:

1. An apparatus for removing VOC's from an exhaust gas stream comprising:
a resistively heatable honeycomb adsorber possessing an activated carbon phase fitted, on two opposing sides, with a structure for conducting an electric current therethrough and located in the exhaust stream and having a desorption temperature; and, an oxidizer capable of oxidizing the VOC's and located in the exhaust stream downstream from the adsorber structure.

2. The apparatus of claim 1 wherein the adsorber is a porous monolithic structure.

3. The apparatus of claim 1 wherein the oxidizer is an electrically heatable catalytic structure.

4. The apparatus of claim 1 wherein the oxidizer is an ignitable thermal oxidizer or a catalyst bed capable of being heated or thermally ignited.

5. The apparatus of claim 3 wherein the catalytic structure comprises a catalyst supported on a substrate.

6. The apparatus of claim 3 wherein the catalyst structure is an oxidation catalyst.

7. The apparatus of claim 3 wherein the catalyst is selected from the group consisting of platinum, rhodium, palladium, vanadium and or its oxides and mixtures of these.

8. The apparatus of claim 5 wherein the substrate is an extruded honeycomb structure.

9. The apparatus of claim 1 wherein the apparatus comprises a heat exchanger located downstream of the oxidizer.

10. The apparatus of claim 1 wherein the means for conducting an electric current is a pair of conducting metal contacts located on opposing sides of the honeycomb.

* * * * *